United States Patent [19]

Schweitzer et al.

[11] Patent Number: 4,846,852
[45] Date of Patent: Jul. 11, 1989

[54] METHOD AND APPARATUS FOR SEPARATING AND RECOVERING VOLATILE SOLVENTS FROM EXHAUST AIR

[75] Inventors: Stefan Schweitzer, Mönchengladbach; Ernst Golde, Krefeld; Waldemar Mathews, Bergheim, all of Fed. Rep. of Germany

[73] Assignee: Otto Oeko-Tech GmbH & Co KG, Cologne, Fed. Rep. of Germany

[21] Appl. No.: 96,675

[22] Filed: Sep. 14, 1987

[30] Foreign Application Priority Data

Sep. 16, 1986 [EP] European Pat. Off. ........ 86112786.8

[51] Int. Cl.$^4$ .............................. B01D 53/04
[52] U.S. Cl. .......................... 55/31; 55/33; 55/62; 55/74; 55/75; 55/180; 55/208; 55/387; 55/389
[58] Field of Search .................. 55/30, 31, 33, 59, 62, 55/74, 75, 179, 180, 208, 387, 389

[56] References Cited

U.S. PATENT DOCUMENTS

| | | | |
|---|---|---|---|
| 1,577,534 | 3/1926 | Miller | 55/31 |
| 1,614,615 | 1/1927 | Jannek et al. | 55/31 |
| 1,948,779 | 2/1934 | Abbott et al. | 55/31 |
| 1,998,774 | 4/1935 | Bulkeley | 55/62 X |
| 2,570,974 | 10/1951 | Neuhart | 55/31 X |
| 3,150,942 | 9/1964 | Vasan | 55/31 |
| 3,527,024 | 9/1970 | McMinn et al. | 55/62 |
| 3,534,529 | 10/1970 | Mattia | 55/62 |
| 3,712,027 | 1/1973 | Hasz | 55/33 |
| 3,713,272 | 1/1973 | Barrere, Jr. et al. | 55/33 |
| 3,841,058 | 10/1974 | Templeman | 55/33 |
| 4,153,428 | 5/1979 | Saunders et al. | 55/33 X |
| 4,414,003 | 11/1983 | Blaudszun | 55/59 X |
| 4,421,532 | 12/1983 | Sacchetti et al. | 55/59 X |
| 4,473,381 | 9/1984 | Winter | 55/31 X |
| 4,536,197 | 8/1985 | Cook | 55/180 X |
| 4,689,054 | 8/1987 | Vara et al. | 55/62 X |

Primary Examiner—Robert Spitzer
Attorney, Agent, or Firm—Watson, Cole, Grindle & Watson

[57] ABSTRACT

A method and apparatus for separating and recovering volatile solvents from exhaust air containing volatile solvents and water vapor, the method including passing the exhaust gas alternatively through one of two beds of molecular sieve packings composed of a material capable of adsorbing the water vapors therein and then through one of two beds of molecular sieve packings composed of a material capable of adsorbing the solvent vapors therein. Heated air or inert gas is passed through the beds not being used to adsorb either the water vapor or the solvent vapors so as to regenerate the molecular sieve packings. The air or inert gas containing solvent is passed through a condenser and a drip collector so as to recover the solvent therefrom.

8 Claims, 1 Drawing Sheet

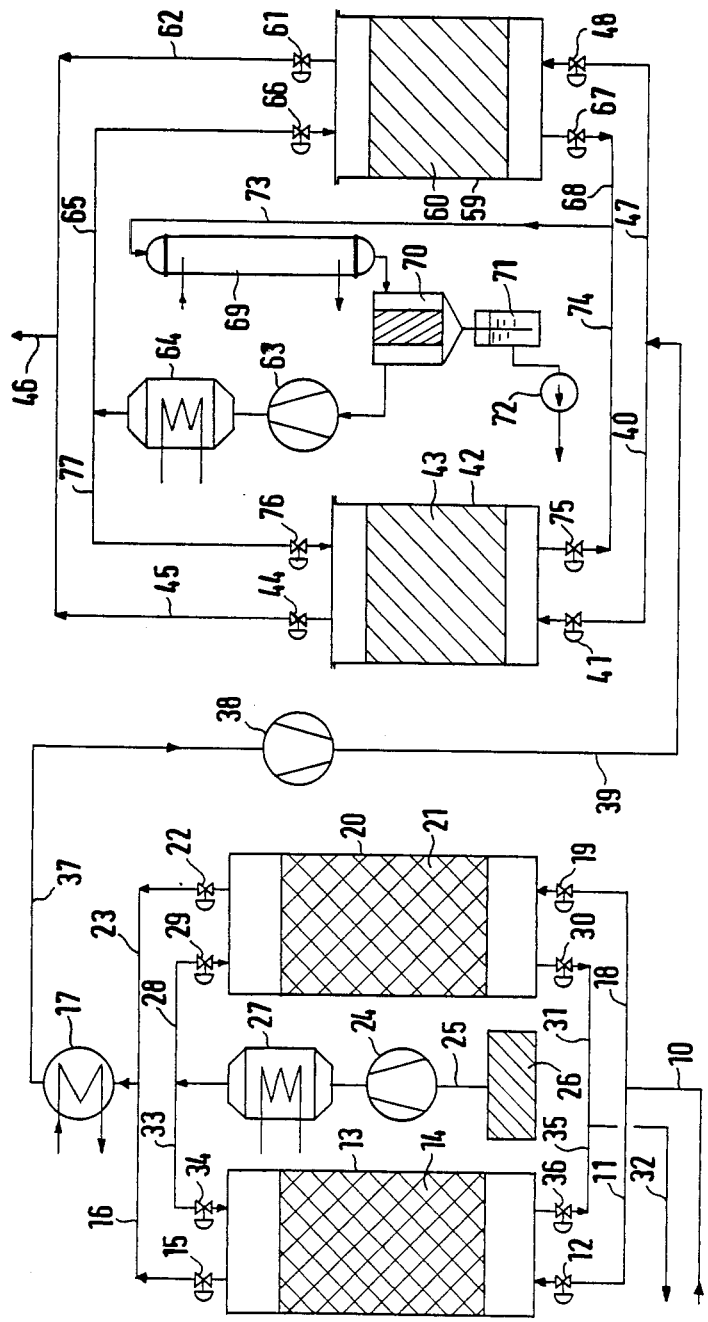

METHOD AND APPARATUS FOR SEPARATING AND RECOVERING VOLATILE SOLVENTS FROM EXHAUST AIR

BACKGROUND OF THE INVENTION

1. Field of The Invention

The present invention relates to a method and an apparatus for the separation and recovery of volatile solvents from water vapor-containing exhaust air emitted from dry-cleaning machines, metal degreasing installations, installations for the cleaning of electronic conductor plates, solvent baths and similar installations, wherein the exhaust air is led through regeneratable molecular sieve packings and then discharged into the atmosphere.

2. The Prior Art

A method and apparatus for the recovery of volatile solvents from water vapor-containing exhaust air is known. However, it has been found in practice that the recovery of the solvents is difficult or at least expensive, because the water vapor is not adequately separated from the solvent vapors. As such, the obtained solvent condensate must be further treated to remove the water contained therein.

It is thus an object of the present invention to improve on the known method and apparatus for recovering solvent vapors from exhaust air containing water vapor and solvent vapors, i.e., to provide a method and apparatus which enables an effective and economical separation of the water vapor and the solvent vapors from the exhaust air, such that the recovered solvent is water-free.

SUMMARY OF THE INVENTION

According to the invention an exhaust air containing solvent vapors and water vapor is first passed through a bed of molecular sieve packings made of a material capable of adsorbing the water vapor in the exhaust air and then through a bed of molecular sieve packings made of a material capable of adsorbing the solvent vapors in the exhaust air, such that the water vapor and the solvent vapors will be respectively adsorbed in the beds. Periodically the flow of exhaust gas is stopped and air or inert gas is caused to flow through the respective beds to remove the water and solvent contained in the beds, thus regenerating them. The air or inert gas which then contains the solvent is passed through a condenser and into a drip collector so that the solvent will be recovered as a condensate. The obtained solvent is free of water vapor. Multiple beds of molecular sieve packings made of a material capable of adsorbing water vapor and solvent vapors can be used so as to continuously treat a flow of exhaust air.

The invention will be better understood by reference to the attached figure, taken in conjunction with the following discussion.

DESCRIPTION OF THE FIGURE

The attached FIGURE schematically depicts a preferred embodiment of an apparatus according to the invention which is adapted to continuously separate water vapor and solvent vapors from an exhaust gas containing them.

DETAILED DESCRIPTION OF THE PREFERRED EMBODIMENT

As shown in the FIGURE, the apparatus includes two adsorption containers 13 and 30 which contain beds of molecular sieve packings 14 and 21 of known water vapor-adsorbing materials (such as type 3 A) and two adsorption containers 42 and 59 which contain beds of molecular sieve packings 43 and 60 of known solvent vapor-adsorbing materials (such as type 3 X or silica gel or aluminium oxide or molecular sieve coke). A pipe 10 which carries an exhaust gas containing moisture (water vapor) as well as solvent residues (solvent vapors) from a source (not shown), such as a dry-cleaning machine, etc., connects with two branch pipes 11 and 18. Branch pipe 11 leads via a valve 12 to the first adsorption container 13. The exhaust gas streams upwardly through the molecular sieve packing 14 (in the container 13), whereby the air humidity is filtered out up to a dew point of max. $-80°$ C., without causing any noticeable adsorption of the solvent vapor contained in the exhaust gas. Through a valve 15 and a pipe 16 the exhaust gas, from which the moisture has been removed, flows to a heat exchanger 17, wherein the adsorption heat is removed from the water vapor-free exhaust gas and wherein it is cooled to about $+5$ to $+20°$ C. The second branch pipe 18 leads via a valve 19 to the second adsorption container 20. The container 20 and the molecular sieve packing 21 are identical to container 13 and molecular sieve packing 14. From container 20 a pipe 23 runs through a valve 22 leading, similarly to line 16, to the heat exchanger 17.

While the adsorption container 13 is charged (valves 12 and 15 are open), the previously charged container 20, whose valves 19 and 22 are closed, is regenerated. For this purpose a ventilator 24 is used to force air (from the atmosphere), inert gas (from an inert gas source) or pure gas (e.g. from exhaust pipe 46) through the filter 26, the pipe 25 and into the heater 27. In the heater 27 the air, the inert gas or the pure gas is heated, either directly (electrically) or indirectly (by steam or a heat-carrying oil), to a temperature of between 100° and 200° C. The hot gas then flows through a pipe 28 and an open valve 29 into the adsorption container 20 and through the molecular sieve packing 21 therein from top to bottom. In this manner the water adsorbed in packing 21 is expelled and the water vapor flows through a valve 30 and pipe 31 to an exhaust pipe 32, for discharge into the atmosphere. After the regeneration of the molecular sieve packing 21, the heater 27 is turned off and the molecular sieve packing 21 is blown cold by leading pure gas, for example from pipe 46, as cooling air into the ventilator 24. After the regeneration and cooling of the molecular sieve packing 21 is completed, the adsorption containers 13 and 20 are switched, i.e., the molecular sieve packing 14 is regenerated and the molecular sieve packing 21 is charged. For the regeneration process the container 13, similarly to container 20, has a line 33 with valve 34 leading from the heater 27, as well as a line 35 with valve 36 leading to the exhaust pipe 32.

After the adsorption of the moisture in one of the two molecular sieve packings 14, 21 and cooling in the heat exchanger 17, the water-free exhaust gas is sucked by a ventilator 38 through a pipe 37 and led through a pipe 39 to the second pair of adsorption containers 42 and 59. It is thus possible for the exhaust gas to reach adsorption container 42 via a branch pipe 40 and a valve 41. The exhaust gas thus flows through the molecular sieve packing 43 from bottom to top, whereby it is stripped of solvent vapors and then flows through a valve 44 and a pipe 45 to a discharge pipe 46, from which the exhaust gas, which is free of moisture and solvent vapors, is discharged into the atmosphere.

However, it is also possible for the exhaust gas to be led by the ventilator 38 through the pipe 39, depending on the setting of the appropriate valves, through a branch line 47 and a valve 48 into the adsorption container 59. The container 59 and the packing 60 are identical to container 42 and packing 43, The exhaust gas from container 59 passes through a valve 61 and a pipe 62 to discharge pipe 46.

While the container 42 is charged, container 59 is regenerated. For this purpose the ventilator 63 brings air or inert gas to a heater 64 in a closed circuit. In this heater 64 a direct (electrical) or indirect (by steam or a heat-carrying oil) heating of the air or the inert gas to a temperature of between 40° C. and 250° C. takes place. The heated gas reaches the adsorption container 59 through a pipe 65 and a valve 66, whereby it flows through the molecular sieve packing 60 from the top to the bottom and thus expels the solvent adsorbed in the previous charging process. The solvent vapors are then led through a valve 67 and a pipe 68 to a condenser 69, in which they are cooled in such a manner that the overwhelming share of the solvent vapors are liquified. Depending on the dewpoints of the solvents or solvent mixtures, the condenser 69 is charged with cooling water (about 20° C.), brine (about −20° C. to +5° C.) or cooling agent (about −40° C. to −20° C.). The liquid solvents are separated from the circuit gas in a drip separator 70 and flow into a sump 71. From sump 71 the liquid solvents are pumped back to a solvent tank (not shown) by means of a pump 72. The circulating gas, essentially stripped of solvet vapors, flows to the suction side of the ventilator 63 and is thus brought back into the circuit.

After an elapsed time of 1 to 5 hours the heating phase is terminated by switching off ventilator 63 and heater 64. During the subsequent cooling phase, cold exhaust gases are blown by ventilator 38 through pipes 39 and 47 and a valve 48 into the container 59 and thus flow through the molecular sieve packing 60 from the bottom to the top (valve 67 is closed during this procedure). The cold exhaust gas cools the molecular sieve packing 60 and is then discharged from the container through valve 66 (valve 61 is closed during this procedure). Through pipe 65 the now heated exhaust gas flows through the switched off heater 64 and the switched off ventilator 63 and drip separator 70 into the condenser 69. Here the exhaust gas is cooled and flows through the pipe 73, the pipe 74, and valve 75 into the adsorption container 42. The valve 41 is closed during this procedure. The exhaust gas rises upward through the molecular sieve 43, which is still in the charge phase during the cooling phase of molecular sieve 60. On the top side of the adsorption container 42 the exhaust gas moves through the valve 44 into the pipes 45 and 46 and escapes into the atmosphere. Another valve 76 at the top of the adsorption container is closed during this time; this valve is in a pipe 77 which is connected with pipe 65 as well as the discharge line from the heater 64.

After 1 to 3 hours the cooling phase of container 59 is terminated so that now a switching of the charging from container 42 to container 59 can take place. During the charging of the container 59, the container 42 is correspondingly regenerated.

The molecular sieve packings 14, 21, 43 and 60 can be in the form of balls or cylinders made of grains having sizes of 1 to 10 mm.

We claim:

1. A method of continuously separating and recovering solvent vapors from exhaust air containing solvent vapors and water vapor, said method including the steps of
   (1) providing a pair of beds of molecular sieve packings composed of a material capable of adsorbing the water vapor in said exhaust air,
   (2) providing a pair of beds of molecular sieve packings composed of a material capable of adsorbing the solvent vapors in said exhaust air,
   (3) passing said exhaust air in a first direction throug a first of said pair of beds provided in step (1) so that the water vapor in said exhaust air will be adsorbed on the molecular sieve packings therein, thereby providing a water vapor-free exhaust air,
   (4) passing said water vapor-free exhaust air in a first direction through a first of said pair of beds provided in step (2) so that the solvent vapors in said water vapor-free exhaust air will be adsorbed on the molecular sieve packings therein,
   (5) discontinuing step (3),
   (6) passing said exhaust air in a first direction through a second of said pair of beds provided in step (1) so that the water vapor in said exhaust air will be adsorbed on the molecular sieve packings therein, thereby providing a water vapor-free exhaust air,
   (7) simultaneously with step (6), passing heated air or inert gas through said first of said pair of beds provided in step (1) in a second direction opposite to said first direction so as to remove the water adsorbed on the molecular sieve packings therein,
   (8) discontinuing step (4),
   (9) passing said water vapor-free exhaust air in a first direction through a second of said pair of beds provided in step (2) so that the solvent vapors in said water vapor-free exhaust air will be adsorbed on the molecular. sieve packings therein,
   (10) simultaneously with step (9), passing heated air or inert gas through said first of said pair of beds provided in step (2) in a second direction opposite to said first direction so as to remove the solvent adsorbed on the molecular sieve packings therein,
   (11) discontinuing step (6) and then repeating step (3),
   (12) simultaneously with step (11), passing heated air or inert gas through said second of said pair of beds provided in step (1) in a second direction opposite to said first direction so as to remove the water adsorbed on the molecular sieve packings therein,
   (13) discontinuing step (9) and then repeating step (4), and
   (14) simultaneously with step (13), passing heated air or inert gas through said second of said pair of beds provided in step (2) in a second direction opposite to said first direction so as to remove the solvent vapor adsorbed on the molecular sieve packings therein.

2. A method as defined in claim 11, including the step of separating the solvent vapors entrained in the heated air or inert gas in steps (10) and (14).

3. A method according to claim 1, including after steps (7), (10), (12) and (14) the step of passing cooled air or inert gas through said beds in said first directions.

4. An apparatus for treating exhaust air containing solvent vapors and water vapor so as to separate and recover the solvent vapors, the apparatus comprising first and second containers containing beds of molecular sieve packings composed of a material capable of adsorbing water vapor, third and fourth containers containing beds of molecular sieve packings composed of a material capable of adsorbing solvent vapors, a first valved pipe system connected to said first and second containers for supplying an exhaust air containing solvent vapors and water vapor to one or both of said first and second containers so that the exhaust air can flow through the molecular sieve packings therein, the molecular sieve packings adsorbing the water vapor from the exhaust air passing therethrough and converting the exhaust air into a water vapor-free exhaust air, a heat exchanger, a second valved pipe system connected between said first and second containers and said heat exchanger for conveying the water vapor-free exhaust air from one or both of said first and second containers to said heat exchanger, a third valved pipe system connected between said heat exchanger and said third and fourth containers for conveying the water vapor-free exhaust air from said heat exchanger to one or both of said third and fourth containers so that the water vapor-free exhaust air from said heat exchanger can flow through the molecular sieve packings in one or both of said third and fourth containers, the molecular sieve packings therein adsorbing the volatile solvents from the water vapor-free exhaust air passing therethrough, a first ventilator connected in said third valved pipe system a condenser, a fourth valved pipe system connected between said third and fourth containers and said condenser, a drip separator, a first connection line connected between said condenser and said drip separator, a first heater, a second ventilator, a second connection line connected between said drip separator and said second ventilator, and a third connection line extending between said second ventilator and said first heater, and a fifth valve pipe system connected between said first heater and said third and fourth containers.

5. An apparatus according to claim 4, including a sixth valved pipe system connected between said first and second containers and the atmosphere for discharging water vapor therefrom.

6. An apparatus according to claim 4, including a second heater, a third ventilator, a fourth connection line connected between said third ventilator and said second heater, and a seventh valved pipe system connected between said second heater and said first and second containers.

7. An apparatus according to claim 4, wherein said molecular seive packings in said first, second, third and fourth containers are in the form of balls.

8. An apparatus according to claim 4, wherein said molecular sieve packings in said first, second, third and fourth containers are in the form of cylinders.

* * * * *